United States Patent [19]
Driessen et al.

[11] Patent Number: 5,574,771
[45] Date of Patent: Nov. 12, 1996

[54] INTEGRATED COMMUNICATION SYSTEM

[75] Inventors: Peter F. Driessen, Aberdeen; Lawrence J. Greenstein, Edison; Krishan K. Sabnani, Westfield, all of N.J.

[73] Assignee: Lucent Technologies Inc., Murray Hill, N.J.

[21] Appl. No.: 290,168

[22] Filed: Aug. 15, 1994

[51] Int. Cl.⁶ ..................................................... H04Q 7/12
[52] U.S. Cl. .............................................. 379/57; 379/58
[58] Field of Search ................................. 379/56, 57, 58, 379/59, 60; 455/33.1, 33.2, 54.1

[56] References Cited

U.S. PATENT DOCUMENTS

| | | |
|---|---|---|
| D. 343,171 | 1/1994 | Taylor . |
| 5,054,052 | 10/1991 | Nonami . |
| 5,117,449 | 5/1992 | Metroka et al. . |
| 5,128,980 | 7/1992 | Choi . |
| 5,142,279 | 8/1992 | Jasinski et al. . |
| 5,148,473 | 9/1992 | Freeland et al. . |
| 5,153,582 | 10/1992 | Davis . |
| 5,153,903 | 10/1992 | Eastmond et al. . |
| 5,175,758 | 12/1992 | Levanto et al. . |
| 5,212,721 | 5/1993 | DeLuca et al. . |
| 5,247,700 | 9/1993 | Wohl et al. . |

*Primary Examiner*—Jason Chan
*Assistant Examiner*—Nay Aung Maung

[57] ABSTRACT

A telephone or two-way digital paging communication system providing an alternative partial communication format in which an acknowledgement signal is transmitted from a telephone device in response to a received voice or data signal. The communication system is switchable between different types of communication formats including full two-way voice or data service, partial two-way service and one-way pager service. The communication system may be implemented in a cellular network in which a portable cellular telephone is adapted to transmit signals at different transmission rates so as to increase its operable range.

31 Claims, 5 Drawing Sheets

INTEGRATED COMMUNICATION SYSTEM

BACKGROUND OF THE INVENTION

1. Field of the Invention

The subject invention relates to a communication system having at least two communication formats. More particularly, it relates to a telephone system adapted to be switchable between a full service two-way communication format and a partial two-way communication format having an acknowledgement response.

2. Background of the Invention

Conventionally wired telephone systems, as well as cellular telephones are well known in the art. Similarly, mobile pagers are also well known in the art. While each art has advanced to a sophisticated level, there are still a number of shortcomings associated with each.

Cellular telephones have gained wide-spread acceptance over the recent years. The trend in growth of the cellular telephones has continued to be positive, especially as the technology has evolved to enable reductions in the size and weight of portable cellular telephones. However, two distinct disadvantages are still associated with portable cellular telephones.

First, even though the number of regional areas covered by cellular communications system antennas has greatly increased over the recent years, the cell coverage available to a portable cellular telephone user is still relatively limited compared to conventionally wired telephone systems. For example, frequently when the cellular telephone user travels outside a major urban or suburban region covered by cellular communications system antennas, the user will fall outside of cellular communication coverage rendering the portable cellular telephone inoperative until once again the user travels within a cellular covered region. Further, the cost of operation associated with portable cellular telephones is still somewhat expensive relative to conventionally wired telephone systems.

In contrast to the portable cellular telephone, a paging system is a one-way radio communication system. For example, an individual wishing to contact someone with a pager usually calls a central telephone number to access the central paging control. Once accessed, the caller can either leave a voice message for the paged individual or can key in a desired telephone number or text message to be displayed on the pager's display.

The pager solves some of the aforementioned problems associated with the portable cellular telephone. A mobile paging unit has a much greater region of operability in contrast to the limited operable range of the portable cellular telephone due to the high power of the paging base station transmitter. Further, operation of a pager unit may be employed for a much lower cost relative to the aforementioned high cost associated with the portable cellular telephone. A pager allows a user to receive the number of the calling party, thereby enabling the pager user to screen incoming calls so as to determine which telephone number to call back, thus eliminating the charges for unwanted calls which are commonly associated with portable cellular telephones.

However, a distinct shortcoming associated with paging units are their inability to establish two-way communication. Therefore, while the pager solves some of the limitations associated with portable cellular telephones and vice versa, the user has the burden of carrying and maintaining both devices so as to gain the advantages of both devices and mitigate the disadvantages associated with each.

An obvious solution to obviate the problem of carrying a portable cellular telephone along with a pager unit is to integrate a cellular telephone with a pager unit into one communication component. Examples of this can be found in U.S. Pat. Nos. 3,247,700 to Wohl et al., 5,175,758 to Levanto et al., 5,153,903 to Eastmond et al. and 5,117,449 to Metroka et al. However, a disadvantage exists with an integrated cellular telephone and pager, in that such a device is still only capable of establishing full two-way service communication, via the cellular telephone components, or no return service, i.e., the one-way service provided by the pager unit. For example, when such an integrated cellular telephone and pager travels outside a region covered by a cellular communications system antenna but is still within a region covered by a pager system antenna, the integrated device is inoperative to respond to a received message, via the pager unit. Further, when such an integrated device is within a region covered by a cellular communications system antenna, the integrated unit only provides the user with the options of either responding to a received paged or telephone message through the expensive method of establishing full two-way service communication through the portable cellular telephone or not responding at all. Thus, if the user desires to respond to a received paged message, the user must implement the costly method of establishing two-way communication via the cellular telephone.

SUMMARY OF THE INVENTION

The subject invention is directed to a communication system, and more particularly to a telephone communication system which is operative to provide at least two communication formats with one format being a partial communication format in which an acknowledgement signal is transmitted from one communication device to another. In accordance with a preferred embodiment of the subject invention, the communication system includes a first and second communication devices adapted to communicate with each other and means for providing full service two-way communication (i.e., voice and/or data communication) between the first and second communicating devices. The communication system further includes means for providing partial two-way communication between the first and second communication devices wherein a first communicating device is enabled to establish full service communication (i.e., voice or data with the second communicating device) while the second communicating device is limited to a partial response (data communication) to the first communicating device. Preferably, the partial response comprises an acknowledgement signal (i.e., a YES/NO type of response or one of several prerecorded canned messages) chosen from the keypad of the telephone handset. Further provided is means for enabling one-way pager service and voice mail service between the first and second communicating devices.

Another preferred embodiment is the implementation of the communication system of the subject invention in a cellular telephone network including telephone devices for first and second users wherein at least one telephone device is a cellular telephone. The cellular network includes a plurality of base stations each having a coverage area for servicing a cellular telephone located therein. The cellular network further includes means for providing full two-way voice service between the telephone devices of the first and second users and means for providing partial data service from the cellular telephone user to the second user. The partial service has a transmission rate which is less than the transmission rate of full two-way voice service. The limited service may be used as a convenience feature by the cellular telephone user as well as to extend the operable range of the cellular telephone.

The cellular network in yet another preferred embodiment is configured to include a plurality of macrocells and microcells each having a base station. Each microcell is operative to provide full two-way voice service and partial two-way service to any cellular telephone located in its coverage region. Each macrocell is operative to provide the aforementioned full two-way voice service and partial two-way service whereby the base station is enabled to provide full voice communication with the cellular telephone and the cellular telephone is enabled with the aforementioned partial service between the base station so as to increase its range of operability whereby each macrocell utilizing partial service has a larger coverage region as compared to each microcell.

Preferably, each cellular telephone implemented in the communication system of the subject invention is provided with both a high speed modem and low speed modem. The high speed modem is operative to enable the cellular telephone to function with full two-way voice or data service while the low speed modem is operative to enable the cellular telephone to function with partial two-way service which has a lesser transmission rate than full two-way service.

Yet another preferred embodiment of the subject invention is a two-way digital messaging system for establishing a connection between messaging devices of a first and second user. Each messaging device includes a radio transceiver for receiving and transmitting messages wherein at least one of the messaging devices is a two-way pager. The aforementioned system further includes a two-way pager network for transmitting messages between the messaging devices of the users.

The two-way pager network includes a plurality of base stations each with a coverage area for servicing a two-way pager located within the coverage area. Further provided in the network is means for providing two-way data service between the messaging devices of the first and second users and means for providing one-way service to a paging device user.

BRIEF DESCRIPTION OF THE DRAWINGS

The foregoing features of the present invention will become more readily apparent and may be understood by referring to the following detailed description of illustrative embodiments in accordance with the subject invention with reference to the drawings wherein.

DETAILED DESCRIPTION OF THE PREFERRED EMBODIMENTS

Figure 1:
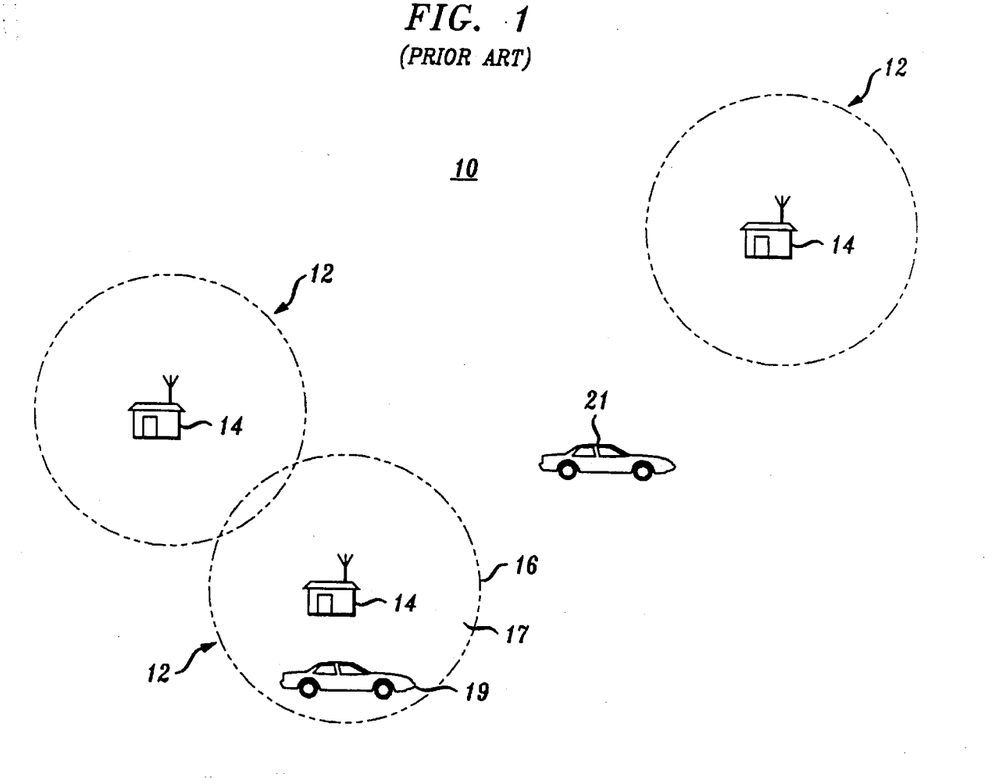
FIG. 1 is a schematic illustration of a prior art cellular network consisting of a plurality of cells.

Referring now to the drawings, in which like reference numerals identify similar or identical elements, FIG. 1 illustrates a prior art cellular radio network 10 consisting of a plurality of cells 12 in which each cell 12 is provided with a base station 14. It is to be appreciated that the communication system of the subject invention is to be described in conjunction with a cellular network for convenience only, as a cellular network is only one intended arena for the implementation of the subject invention. As described hereinbelow, it will become readily apparent that the communication system of the subject invention may be implemented in various communication arenas, such as paging systems, conventional wired telephone systems and data communication systems as well as specialized mobile radio systems for dispatch or data queries with or without telephone interconnections.

In the prior art cellular radio network 10 illustrated in FIG. 1, boundary line 16 defines the coverage area 17 where the maximum power transmitted from a mobile subscriber 19 toward the base station 14 is sufficient enough to enable reliable two-way radio communication between the two as it is well known in the art that the available data rate from a cellular telephone increases as its transmitting power increases. The transmitting power is defined by the power available from the power source of the cellular telephone.

Still in reference to FIG. 1, when a mobile subscriber 21 crosses out of the coverage area 17, and does not enter another coverage area of an adjacent cell, the portable cellular telephone of the mobile subscriber 21 is consequently inoperative to establish radio communication with any base station in the cellular radio network 10.

In the prior art cellular radio network 10, cellular radio communication is only enabled when the mobile subscriber enters into a coverage area defined by a boundary line associated with the maximum transmission range of a portable cellular telephone and a base station of the cellular radio network 10. Further, when a mobile subscriber is within a coverage area of a base station, such as coverage area 17, the mobile subscriber 19 is only enabled to establish costly full two-way service communication.

Figure 2:
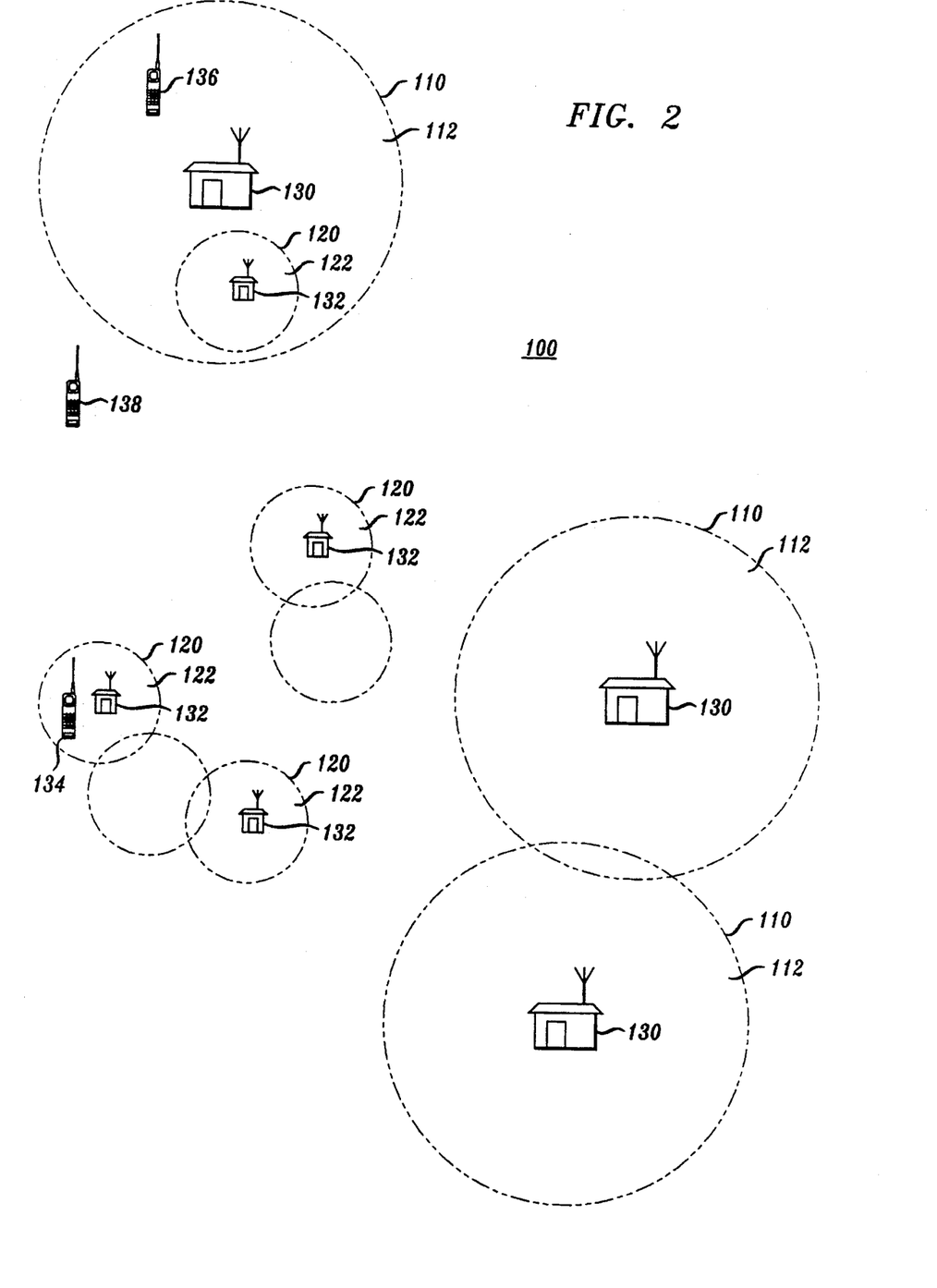
FIG. 2 is a schematic illustration of a cellular network arranged in accordance with a preferred embodiment of the subject invention.
Figure 3:
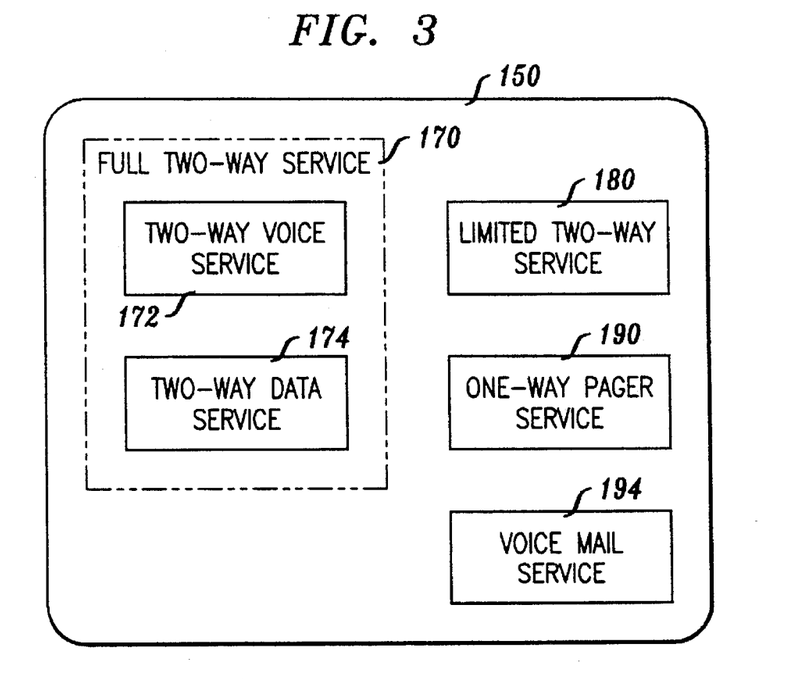
FIG. 3 is a block diagram of the services offered by the communication system of the cellular network of FIG. 2.

Referring to FIG. 2, there is illustrated a cellular network 100 arranged in accordance with a preferred embodiment of the subject invention. Specifically, cellular network 100 is arranged for the implementation of the communication services offered by the personal communication system 150 of the subject invention as illustrated in FIG. 3. As will be fully described below, communication system 150 enables a portable cellular telephone user to establish either full two-way service 170 or a more partial and economical two-way communication format 180 with a base station. In particular, the partial two-way communication format 180 includes the provision of a limited acknowledgement data response signal being transmitted from a portable cellular telephone toward a base station.

Illustrated in FIG. 2 is a plurality of macrocells 110 defined by a coverage area 112 along with a plurality of microcells 120 similarly defined by a coverage area 122. Each individual macrocell 110 and microcell 120 is respectively provided with a base station 130 and 132. As is conventional, each base station is in radio contact with many wireless terminals. The system infrastructure is the combination of hardware and software that links base stations with cellular switches, and cellular switches with one another. In the preferred embodiment, each macrocell base station transmits upon 20 watts per channel and each microcell base station 132 transmits upon approximately 20 milliwatts per channel, each preferably providing a transmission of 20 kilo bits per second (kbps) for voice transmissions. It is to be appreciated by one ordinarily skilled in that art that each base station 130, 132 is not to be understood to be limited to 20 watts per channel and 20 kbps, but rather it is to be understood that the power and transmission rate of each base station 130, 132 may be readily varied to accommodate desired parameters of the communication system 150.

Referring now in conjunction with FIGS. 2 and 3, when a portable cellular telephone 134 is within a coverage area 122 defined by a microcell 120, the communication system 150 enables the mobile subscriber to be provided with either full service two-way voice telephone service 172 or full two-way data service 174, both of which are well known in the art. It is noted that the available data rate increases as the cell size decreases (since the multipath delay spread decreases in smaller cells), therefore microcells 120 are advantageous over macrocells 110 for providing full two-way service 170 in view of the smaller microcell coverage area 122 as compared to the larger macrocell coverage area 112. The communication system 150 of the subject invention further provides the aforementioned partial two-way service 180 or one-way pager service 190 when the portable cellular telephone 134 is located within a coverage area 122 of a microcell 120. The partial two-way service 180 and one-way pager 190 communication formats will be described in detail further below.

When a portable cellular telephone 136 is outside a coverage area 122 of a microcell 120, but inside a coverage area 112 of a macrocell 110, the communication system 150 still provides the aforementioned partial two-way service 180 or a one-way pager service 190 communication format. It is noted that in the prior art cellular network 10 (FIG. 1), when a portable cellular telephone 21 is located at a sufficient distance away from a base station 14, the portable cellular telephone 21 is unable to transmit data at a transmission rate sufficient to establish full two-way service 170 between the base station and portable cellular telephone 21 in view of its limited power source, and thus no communication may be established between the portable cellular telephone 21 and the base station 14 even though the base station 14 is frequently fully capable of communicating with the cellular telephone 21 (since the base station is provided with a larger and more powerful power source than a portable cellular telephone).

As mentioned above, the communication system 150 of the subject invention overcomes the aforementioned setback of the prior art cellular network 10 by providing partial two-way service 180 between a portable cellular telephone 136 and a base station 130, as well as one-way pager communication service 190 from the base station 130 to the portable cellular telephone 136 when the user is outside of a coverage area 122 of a microcell 120 but still within a coverage area 112 of a macrocell 110. It is noted that full two-way service 170 is available in a macrocell 110 when a portable cellular telephone 136 is in close proximity to a macrocell base station 130. Further, the aforementioned partial two-way service 180 and one-way pager service 190 are also provided in addition to the aforementioned full two-way service communication format 170, when the portable cellular telephone 134 is within a coverage area 122 of a microcell 120.

Referring now to FIG. 3, when full two-way service communication 170 is available, the communication system 150 of the subject invention is configured to provide two-way voice telephone service 172 or full two-way data service 174, such as Cellular Digital Packet Data (CDPD). Preferably, the data transmission rate for the aforementioned two-way communication format 170 is 20 kbps for both a portable cellular telephone and a base station.

As aforementioned, partial two-way service 180 or one-way pager service 190 are provided by the communication system 150 when a portable cellular telephone is within either a macrocell 110 or a microcell 120. However, partial two-way service 180 and one-way pager service 190 are the only formats of communication provided by the communication system 150 when a low power portable cellular telephone 136 is outside of a microcell 120 but inside a macrocell 110 (and not in close proximity to a macrocell base station 130). As will be described in detail below, partial two-way service 180 may not be available when a portable cellular telephone 138 is in close proximity to the outer periphery of a macrocell 110 and is not available when outside of a macrocell 110.

Partial two-way service 180 is when a portable cellular telephone may receive a generally long voice message (i.e., up to one minute) or a full screen of data from a base station at the full transmission rate of preferably 20 kbps, but may only transmit a limited amount of information (i.e., a YES/ NO type of response or one of several prerecorded canned messages) to the base station at a reduced transmission rate. Preferably, this reduced transmission rate is approximately 20 bps. Such a reduced transmission rate (20 bps) requires about 20 milliwatts of power from the power source of a portable cellular telephone in order to communicate with a 20 watt 20 kbps base station when it otherwise in the prior art would be unable to do so. It is noted that the reduced transmission rate of 20 bps requiring approximately 20 milliwatts has been chosen as a preferred embodiment in view of, and as is well known, that the rate or distance covered by a radio communication system is not changed significantly if both the power and data rate are reduced by the same factor (i.e., in the preferred embodiment, this factor is approximately 1000). For example, when a portable cellular telephone 136 is within a macrocell 110 but outside of a microcell 120, the cellular telephone 136 in the prior art would be out of range to transmit at a full data rate (20 kbps) sufficient to establish voice communication with the base station 130 of a macrocell 110 in view of its limited power source. However, in accordance with the communication system 150 of the subject invention, when the cellular telephone 136 reduces its transmission rate (20 bps), it may continue to establish communication with the base station 130 through low speed data signals as opposed to higher speed voice signals. Only when the cellular telephone 138 is outside of the macrocell 110 or near the outer periphery of the macrocell 110 will a cellular telephone 138 be unable (due to the its limited power source and distance from the macrocell base station 130) to continue to transmit data to a macrocell base station 130 at the aforementioned reduced transmission rate (20 bps). Thus the aforementioned partial service 180 is an example of an asymmetrical type of service wherein the base station (due to its larger power source) is enabled to communicate to a cellular telephone with a larger bandrate in comparison to the smaller communication bandrate transmitted from the portable cellular telephone to the base station.

It is to be appreciated that the communication system 150 of the subject invention may be adapted to provide a variable transmission rate for partial service 180. Such a variable transmission rate would enable the system to reduce or increase the transmission rate of a cellular telephone when it correspondingly moves away or towards a macrocell base station 130. Therefore, such a variable transmission rate would enable a cellular telephone or two-way pager device to have a further increased range of operability and operate at an optimum transmission rate in accordance with its distance from a macrocell base station. For example, the partial response service 180 may increase above 20 bps depending on the received signal strength at a base station.

The reduced transmission rate of the partial two-way service 180 enables a cellular telephone 136 to transmit to a base station 130 only a limited amount of information. Typically, a user of portable cellular telephone 136 utilizes the keypad 235 (FIG. 4) associated with the handset of a cellular telephone to transmit the limited amount of data to a base station. Such a limited amount of data may preferably include a YES/NO type of response or may be adapted to enable a user of a cellular telephone to transmit a prearranged message using the keypad 235 of the cellular telephone, wherein each individual button (not shown) of the keypad 235 corresponds with a different prearranged message. Each prearranged response is preprogrammed and stored in a central data bank of a switching network associated with the communication system 150. A prerecorded message is enabled because only a limited number of bits (i.e., 4 bits for 16 possible messages) is required to contain information needed to correlate with and select a prerecorded message stored in a central data bank of a switching network. Thus, each key on the keypad of the telephone correlates to particular data which may be transmitted at the aforementioned limited rate so as to select a particular prerecorded message stored in a central data bank.

In the event partial two-way service 180 is unattainable as mentioned above, or if the user desires not to utilize it, the user may utilize the one-way pager service 190 provided by the communication system 150. The one-way pager service 190 is a pager type of communication format wherein a base station is enabled to transmit to a portable cellular telephone 200 (FIG. 4) a short voice message or a short data message or phone number which is to appear on the data display 230 (FIG. 4) of a portable cellular telephone 200 and the portable cellular 200 telephone is unable to communicate back to the transmitting base station. It is noted that the base station may be adapted to transmit its paged message to the cellular telephone 200 at a lower data rate (than 20 Kbps) while retaining its high power (20 watts) so as to increase the probability of establishing communication with the cellular telephone 200.

The communication system 100 may be further configured to provide a voice mail service 194 when a portable cellular telephone 138 is out of range from a base station 130 to receive a paged message 190 or when the user has advised the communication system 150 that all calls should be forwarded to voice mail 194. When the user of a portable cellular telephone 136 is within range of a base station 130, the user may access voice mail 194 to receive any stored messages.

The communication system 150 may still be further configured to include a screening service 196 (FIG. 3) which is operative to screen incoming calls using caller ID and decide which calls to receive (based upon preprogrammed phone numbers) and which calls are to be rerouted to voice mail 194 and which calls are to receive partial response service 180. Of course, the screening service 196 is only available when a portable cellular telephone 134 is within a microcell 120 or near a macrocell base station 130 so as to establish full two-way service communication 170 with a base station 130,132 when desired by the user. The aforementioned screening service 196 is advantageous in that only desired calls are to be immediately responded by the user, via the cellular telephone, thus unwanted phone calls may be responded to at a later time or not at all, thus reducing cost and inconvenience.

Figure 4:
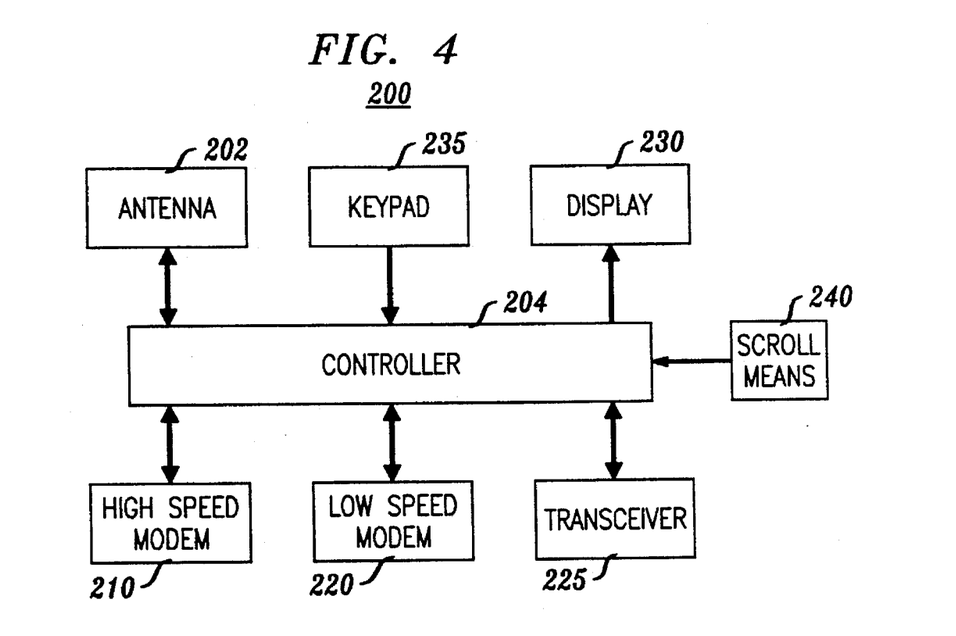
FIG. 4 is a block diagram of a telephone device adapted for use in the cellular network of FIG. 2.

In a preferred embodiment of the communication system 150, a block diagram of a cellular telephone 200 is illustrated in FIG. 4 which is adapted to be used in conjunction with the above described communication system 150. An example of such a suitable cellular telephone adaptable for implementation of the features of the subject invention is model number 3610, commercially available from AT&T. Cellular telephone 200 includes an antenna 202 for receiving and transmitting voice and/or data communication signals and control means 204 connected in circuit with the antenna 202 for processing signals related to the aforementioned received and transmitted communication signals as is well known in the art. Further, the control means 204 is adapted to determine the transmission rate for transmitted signals in correlation to the type of communication service the cellular telephone 200 is programmed to operate with. For example, if the cellular telephone 200 is programmed to operate with full two-way service 170, then the transmission rate of transmitted signals is to be higher than the transmission rate required for partial two-way service 180.

Cellular telephone 200 further includes the provision of a high speed modem 210 and a low speed modem 220 which are both connected to and controlled by the control means 204. The high speed modem 2 10 is utilized for the transmission of full two-way voice service 172, or full two-way data service 174, wherein the voice and data service 172 and 174 are respectively transmitted at preferably 20 kbps. The low speed modem 220 is utilized for the transmission of the partial two-way service 180 wherein the partial response is transmitted at preferably 20 bps. It is noted, and is mentioned above, that the low speed modem 220 may be adapted to operate at a variable data rate, wherein the data rate may increase above the aforementioned 20 bps depending on the received signal strength at the base station. For example, if the low speed modem 220 operates at approximately 1000 bps, the partial response message may be longer than just a few bits enabling the user to input (using a keypad 235, FIG. 4) a short text message in contrast to referencing a prerecorded message. Preferably, each base station implemented in the communication system 150 is provided with a high speed receiver and a low speed receiver. The high speed receiver is operative to receive messages transmitted from the high speed modem 210, while the low speed receiver is operative to receive messages transmitted from the low speed modem 220. It is to be appreciated that the aforementioned high and low speed modems 210 and 220 may be incorporated into the cellular telephone 200 by one ordinarily skilled in the art.

A preferred embodiment of the low speed modem 220 is a spread spectrum modem which will occupy the same channel bandwidth as the high speed modem 210 by spreading the preferably 20 bps data with 1000 chips per bit to obtain 20,000 chips per second. Such a spread spectrum modem 220 enables a plurality of communication devices, (i.e., a cellular telephone 200 or pager device) to simultaneously communicate with an individual receiver associated with either a macrocell or microcell base station 130, 132.

Further, the low speed modem receiver will utilize spread spectrum demodulation techniques which are well known to those skilled in the art. Thus, the low speed modem 220 will nominally occupy the same channel bandwidth as the high speed modem 210.

The cellular telephone 200 also includes transceiver means 225 connected to the antenna 202 and control means 204 which is operative to receive and transmit voice and data signals from and to the antenna 202 and for connecting the voice and data communication signals with the antenna 202 and control means 204, as is conventional. Further included is display means 230 which is connected to the control means 204 and is operative to display messages thereon (such as phone numbers) from data contained in received messages processed in the control means 204, which is also conventional. A keypad 235 is further provided on the cellular telephone 200, and is operative to enable a user to program the cellular telephone 200 to initiate a desired feature and/or aforementioned service as well as dial phone numbers.

The cellular telephone 200 additionally includes scrolling means 240 for enabling a user to selectively transmit a particular prerecorded message categorized on the display means 235. As aforementioned, the actual prerecorded canned message is not transmitted from the cellular telephone 200, but rather an acknowledgement signal containing particular data which correlates with the selected prerecorded message in the base station is transmitted from the cellular telephone 200. The scrolling means 240 preferably includes conventional UP and DOWN scroll buttons along with a SELECT button (not shown).

It is to be appreciated that the above described parameters for the communication system 150 are for illustrative purposes only and are not to be limited to any aforementioned value as it is to be appreciated that the cellular telephone 200 during partial two-way service 180 may be transmitted in the range of 2–1000 bits per second. Further, and as mentioned above, it is to be appreciated that the communication system 150 has been described in conjunction with a cellular network 100 for illustrative purposes only, as a cellular network is only one intended use for the communication system 150 of the subject invention. It is noted that the above described communication system 150 may be readily implemented in a conventionally wired telephone system wherein all of the aforementioned communication services (i.e. two-way voice, two-way dam, enhanced, partial two-way, one-way pager and voice mail) are consistently available to a user as opposed to a cellular network, in view of the absence of the setbacks associated with cellular transmissions between a cellular telephone and a base station as described above. For example, and as mentioned above, a cellular telephone in a cellular network may be out of range from a base station to establish full two-way service 170 and/or partial two-way service 180. In contrast, a telephone device in a conventionally wired telephone network is unconcerned with transmitting distances between a base station and a radio telephone and thus full two-way service 170 and partial two-way service 180 are always available in a conventionally wired telephone system.

Figure 5:
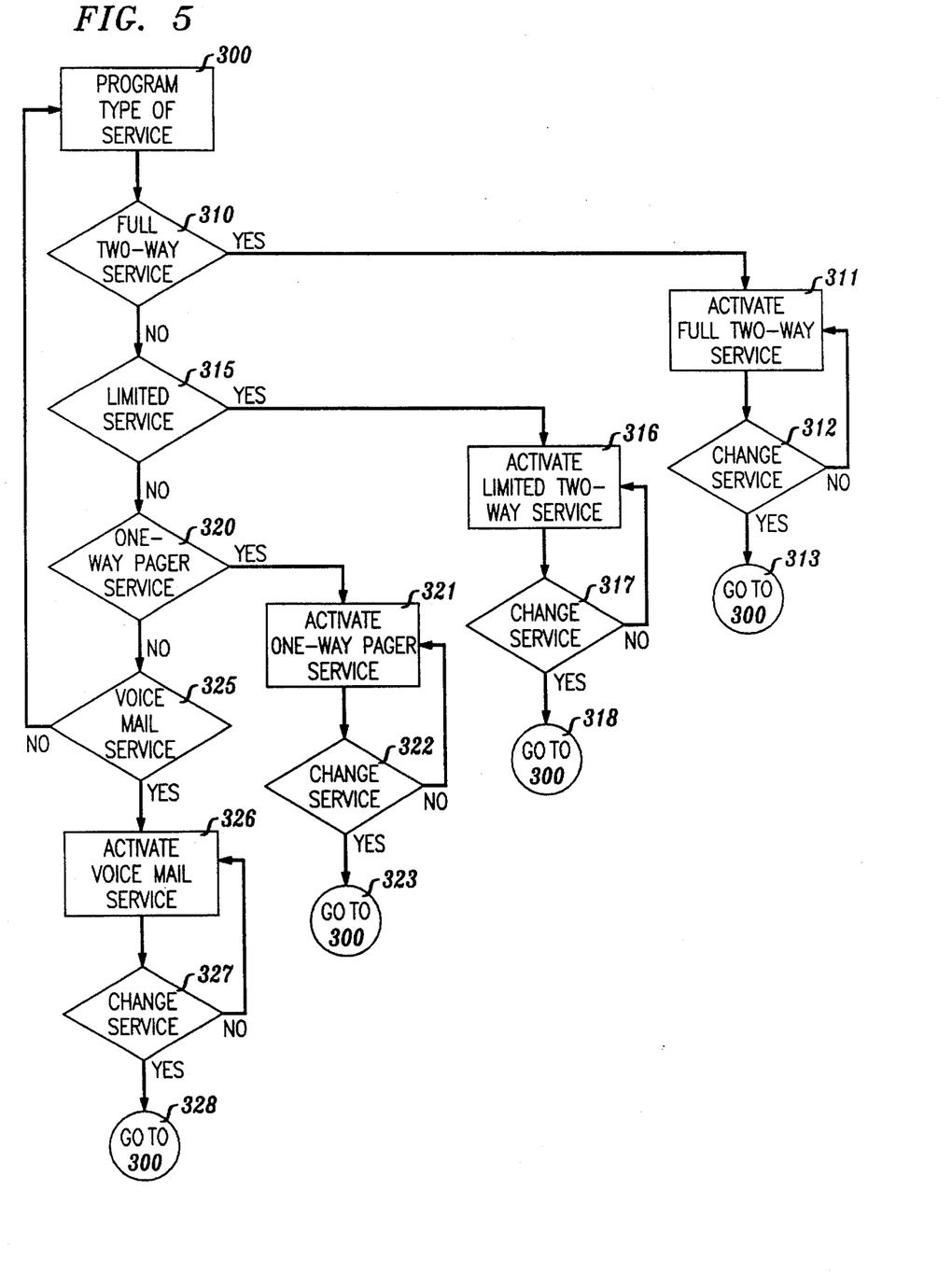
FIG. 5 is a flow diagram representative of the method of programming the offered services of FIG. 3 in the telephone device of FIG. 4.
Figure 6:
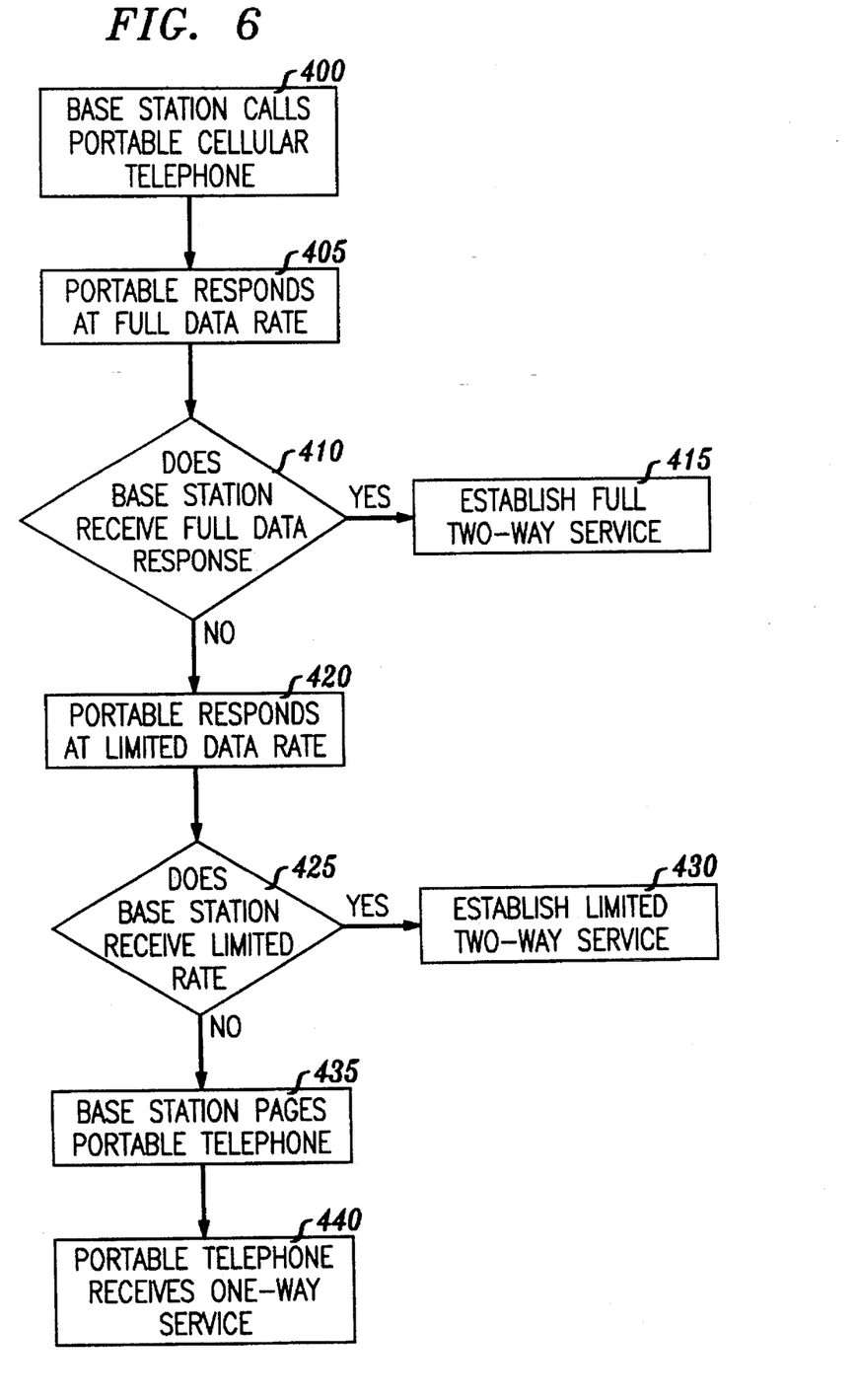
FIG. 6 is a flow diagram representative of the method of operation of the communication system of the subject invention.

Referring now to FIGS. 5 and 6, in conjunction with FIGS. 2–4, the method of use of the communication system 150 of the subject invention will be discussed hereinbelow. Once again discussion will be made of the communication system 150 in conjunction with a cellular network. As mentioned above, such an association is for illustrative purposes only and a method of use for the communication system 150 is not to be understood to be limited to a cellular network but rather may be used in conjunction with any communication system such as a conventionally wired telephone system or a two-way digital messaging system wherein a base station may transmit digital messages at a preferred rate of 20 kbps.

FIG. 5 illustrates a method of programming a cellular telephone 200 to operate with an aforementioned particular type of service provided by the communication system 150 of the subject invention. First, the user activates a program feature (preferably implemented in the control means 204), step 300, in the cellular telephone 200 by depressing an appropriate button on its keypad 235. The control means 204 then determines if the aforementioned full two-way service 170 has been selected, step 310. If yes, the cellular telephone 200 operates with full two-way service 170, step 311, until the user changes the type of service, steps 312 and 313. If the user does not choose full two-way service 170, step 310, the control means 204 determines if the aforementioned partial two-way service 180 has been selected, step 315. If yes, the cellular telephone 200 operates with partial two-way service 180, step 316, until the user changes the type of service, steps 317 and 318. It is noted that partial service 180 may be chosen even though full two-way service 170 is also available. For example, it may be advantageous to choose partial service 180 over full service 170 when the user is, or expects to be in an environment in which a vocal conversation may not be carried out, or it may be inconvenient to do so (i.e, the user is in a meeting, theater or restaurant).

If the user does not choose partial two-way service 180, step 315, the control means 204 determines if the aforementioned one-way pager service 190 has been selected, step 320. If yes, the cellular telephone 200 operates with one-way pager service 190, step 321 until the user changes the type of service, steps 322 and 323. Lastly, if the user does not choose the one-way pager service 190, step 320, the control means 204 determines if the aforementioned voice mail service 194, has been selected step 325. If yes, the cellular telephone 200 operates with voice mail service 194, step 326 until the user changes the type of service, steps 327 and 328. If the user does not choose the voice mail service 194, step 325, the above described programming procedure is then repeated.

FIG. 5 illustrates a method of operation for the aforementioned communication system 150 in conjunction with a cellular telephone 200. The method of operation will be discussed in reference to an outside caller attempting to establish full two-way voice telephone service 170 with a cellular telephone 200 user. Further, it is noted that the below described operation is in reference to a cellular telephone 200 which has been preprogrammed to full two-way service 170 as its priority of service as discussed above with reference to FIG. 4.

First, the callers signal is relayed to a base station, as is conventional, whereafter the base station calls the portable cellular telephone 200, step 400. The cellular telephone 200 then responds to the base station at a full data rate, step 405, so as to attempt to establish full two-way service 170. A determination is then made in the base station as to whether it has received the full data rate response from the cellular telephone 200, step 410. If yes, full two-way service 170 is established between the base station and the cellular telephone 200, step 415.

If the cellular telephone full data response is not received at the base station, step 410, then the communication system 150 is unable to establish full two-way service 170 with the cellular telephone 200. This scenario may arise since the cellular telephone 200 may be out of range from a base station to establish full two-way service 170, as discussed above. After a predetermined period of time, the cellular telephone 200 again responds to the base station at a limited data rate (a data rate less than the full data rate), step 420, so as to attempt to establish partial two-way service 180. A determination is then made in the base station as to whether it has received the partial dam response from the cellular telephone 200, step 425. If yes, partial two-way service 180 is established between the base station and the cellular telephone 200, step 430.

If the partial data response of the cellular telephone 200, is not received at the base station, step 425, then the communication system 150 is unable to establish partial two-way service 180 with the cellular telephone 200. As also mentioned above, this scenario may arise since the cellular telephone 200 may be out of range from a base station to establish partial two-way service 180 between the cellular telephone 200 and a base station. After a second predetermined period of time, the base station proceeds to operate in conjunction with the one-way communication pager service 190 and transmits a paged message to the cellular telephone 200, step 435, whereafter the cellular telephone 200 receives the paged message if it is in range with a base station to do so. It is noted that if the cellular telephone 200 is not within range to receive a one-way paged message from a base station, the callers message may then be stored in voice mail 194, whereafter the cellular telephone 200 user may access it when in range from a base station to do so.

It is appreciated that if the cellular telephone 200 was preprogrammed (as discussed above with reference to FIG. 4) to operate in partial two-way service 180, then the cellular telephone 200 would not respond with a full data response, step 405, but would rather first respond with a partial data response, step 420, so as to attempt to establish partial two-way service 180 if achievable, as discussed above. Similarly, if the cellular telephone was preprogrammed to operate in one-way pager service 190, then the cellular telephone 200 would not respond at all to a base station but would rather accept the one-way message from a base station if achievable. Those skilled in the art will appreciate that alternative communicating schemes may be employed in the communication system 150 of the subject invention for establishing a particular type of an aforementioned communication service between a base station and a cellular telephone 200.

While the invention has been particularly shown and described with reference to preferred embodiments, it will be understood by those skilled in the art that various modifications in form and detail may be made therein without departing from the scope and spirit of the invention. It is to be appreciated for instance, that the communication system 150 of the subject invention may be incorporated into a conventional PBX wired telephone system and is not to be understood to be limited to a cellular telephone network. Further, the limited and one-way pager service may operate on different frequency bands or bands separate from telephone bands. Accordingly, modifications such a those suggested above, but not limited thereto, are to be considered within the scope of the invention.

What is claimed is:

1. A telephone system for establishing a connection between communicating devices of a first and a second user, comprising:
    a) first and second telephone devices of said first and second users, respectively, at least said first telephone device being a cellular telephone and having a radio transceiver for receiving and transmitting messages, said cellular; telephone including at least one modem for transmitting data at both a high bit rate and a low bit rate substantially less than said high bit rate;
    b) a cellular network for transmitting telephone calls between the first and second telephone devices, said cellular network having a plurality of base stations each with a coverage area for servicing cellular telephone devices located within said coverage area, said cellular network including:
        i) means for providing full two-way service at said high bit rate between said telephone devices of said first and second user; and
        ii) means for providing partial communication service from said user of said first cellular telephone to said second user via one of said base stations, said partial service enabling a generally long message to be transmitted from said second to said first user at said high bit rate and a limited message of a duration shorter than said long message to be transmitted from said first to said second user at said low bit rate.

2. A telephone system as recited in claim 1, wherein said means for providing partial service is operative to transmit an acknowledgement response selected from one of a plurality of prearranged responses.

3. A telephone system as recited in claim 1, wherein said cellular network further includes:
    iii) means for providing one-way pager service to said cellular telephone.

4. A telephone system as recited in claim 3, wherein said cellular network further includes:
    iv) means for providing voice mail service wherein transmitted messages from a said telephone device user is stored in a data retrieval system from which said cellular telephone user may retrieve said stored messages at a later time.

5. A telephone system as recited in claim 3, wherein said cellular network further includes switching means for determining when said cellular telephone is located in a said coverage area of said base station at a sufficient distance from a said base station to establish said full two-way voice service with a said second user and to determine when said full two-way voice service is unavailable.

6. A telephone system as recited in claim 5, wherein said switching means is adapted to automatically provide said partial service when said full two-way voice service is determined unavailable.

7. A telephone system as recited in claim 6, wherein said switching means is further adapted to determine when said cellular telephone is located in a said coverage area of a base station at a sufficient distance from a said base station to establish said partial service with a said second user and to determine when said partial service is unavailable.

8. A telephone system as recited in claim 7, wherein said switching means is further adapted to automatically provide said one-way pager service when said partial service is determined unavailable.

9. A telephone system as recited in claim 1, wherein said cellular telephone includes a high speed modem for transmitting messages when said cellular telephone is operating in said full two-way service and said cellular telephone further includes a low speed modem for transmitting messages when said cellular telephone is operating in said partial service.

10. A telephone system as recited in claim 9, wherein said low speed modem utilizes a spread spectrum format whereby said low speed modem will nominally occupy the same bandwidth as said high speed modem.

11. A cellular network for establishing a connection between communicating devices of a first and second user wherein at least one of said communicating devices is a cellular telephone having at least one modem for transmitting data at both a high bit rate and a low bit rate substantially less than said high bit rate, said cellular network comprising:
 a) a plurality of microcells with each said microcell having a base station for servicing said at least one cellular telephone with full two-way communication service when said cellular telephone is located within a said microcell; and
 b) a plurality of macrocells with each said macrocell having a macrocell base station for providing said at least one cellular telephone with full two-way communication service at said high bit rate when said cellular telephone is located within a coverage area of one of said macrocells, and also for providing said cellular telephone with partial service when said cellular telephone is outside said coverage area, said partial service enabling a generally long message associated with the other communication device to be transmitted from said macrocell base station to said cellular telephone and a limited message of shorter duration than said long message to be transmitted from said cellular telephone to said macrocell base station, wherein said limited message is transmitted at said low bit rate.

12. A cellular network as recited in claim 11, further including switching means for determining when said cellular telephone is within a said microcell and within a said macrocell.

13. A cellular network as recited in claim 12, wherein each said cellular telephone includes control means for enabling said cellular telephone to be switchable between said full two-way service and said partial service when said cellular telephone is within a said microcell.

14. A cellular network as recited in claim 13, wherein each said macrocell base station is adapted to provide one-way pager service to a said cellular telephone when said cellular telephone is outside of a said macrocell.

15. A cellular telephone device comprising:
 a) an antenna for receiving and transmitting communication signals;
 b) control means connected with said antenna for processing signals related to said communication signals and for selecting between first and second transmission rates for transmitting signals from said antenna;
 c) transceiver means connected to said antenna and said control means for receiving and transmitting voice and data signals from and to said antenna, and transporting said voice and data communication signals between said antenna and said control means;
 d) a high speed modem connected to said antenna and said control means for transmitting voice and data signals at a first predetermined transmission rate from said antenna; and
 e) a low speed modem connected to said antenna and said control means for transmitting data signals at a second predetermined transmission rate less than said first predetermined transmission rate from said antenna.

16. A cellular telephone device as recited in claim 15, wherein said first predetermined transmission rate is approximately 20 kilo bits per second and said second predetermined transmission rate is approximately 20 bits per second.

17. A cellular telephone device as recited in claim 15, wherein said second predetermined transmission rate is variable.

18. A cellular telephone as recited in claim 15, further including display means for displaying message data contained in incoming calls processed in said control means.

19. A cellular telephone as recited in claim 15, wherein said low speed modem utilizes a spread spectrum format, whereby said low speed modem will nominally occupy the same bandwidth as said high speed modem.

20. A two-way digital messaging system for communicating messages between messaging devices of a first and a second user, comprising:
 a) messaging device of said first and second users, each said messaging device having a radio transceiver for receiving and transmitting messages with at least one of said messaging devices being a pager device;
 b) a two-way pager network for transmitting messages between the messaging devices of said users, said two-way pager network having a plurality of base stations each with a coverage area for servicing a said pager device located within said coverage area, said two-way pager network including:
  i) means for providing two-way service between said messaging devices of said first and second users, wherein said means is adapted to select a data bit transmission rate for a pager device in dependence upon a signal strength of signals transmitted between said pager device and a said base station, with lower and higher bit transmission rates being selected for lower and higher signal strength levels, respectively;
  ii) means for providing one-way data service from a said base station to a said pager device; and
  iii) means for enabling said pager device to be switchable between said two-way service and said one-way data service.

21. A two-way digital system as recited in claim 20, wherein said two-way pager network further includes switching means for determining when a said pager device is located in a said coverage area of a said base station at a sufficient signal strength from a said base station to establish said two-way service with a said second user and to determine when said two-way service is unavailable between a second user and a said pager device.

22. A two-way digital system as recited in claim 21, wherein said switching means is adapted to automatically provide said one-way service when said two-way service is determined unavailable.

23. A two-way digital system as recited in claim 20, wherein said transmission rate of said pager device is within the range of 2 to 1000 bits per second.

24. A two-way digital system as recited in claim 20, wherein said pager device includes a high speed modem for transmitting data messages at a first transmission rate and a low speed modem for transmitting data messages at a second transmission rate which is less than said first transmission rate.

25. A two-way digital system as recited in claim 21, wherein said low speed modem utilizes a spread spectrum format enabling said low speed modem to nominally occupy the same bandwidth as said high speed modem.

26. A two-way digital system as recited in claim 25, wherein said means for providing two-way service is adapted to provide both voice messages and data messages from a said base station to said pager device.

27. A two-way digital system as recited in claim 26, wherein said switching means is adapted to provide voice messages to said pager device when said pager device has a first predetermined signal strength with a said base station and to provide data messages to said pager device when said pager device has a second predetermined signal strength with a said base station wherein said second predetermined signal strength is less than said first predetermined signal strength.

28. In a wireless communications network wherein at least a first wireless or wireline communication terminal is capable of communicating voice/data with at least a second wireless terminal via at least one base station at a first bit rate when the second wireless terminal is within a predetermined coverage area of the base station, a method of communicating, comprising the steps of:

provibing, within the second wireless terminal, means for transmitting data at both high and low bit rates;

receiving, by the second wireless terminal, data transmission by the base station;

transmitting data by the second wireless terminal to the base station at the high bit rate in response to the data transmission by the base station:

transmitting data by the second wireless terminal to the base station at the low data rate after a predetermined period of time following the high bit rate transmission by the second wireless terminal if the high bit rate transmission is not received by the base station;

determining, at the base station, whether the base station has received a communication from the second wireless terminal at the high or low bit rate;

establishing full two-way voice/data communication service if the communication from the second wireless terminal is received at the high bit rate;

establishing partial communication service if the communication from the second wireless terminal is received at the low bit rate, wherein data is communicated from the second wireless terminal to the base station at the low bit rate, and data associated with the first communication terminal is transmitted by the base station to the second wireless terminal at the first bit rate.

29. The method according to claim 28, wherein the communication from the second wireless terminal is a response to a transmission by the base station of data associated with the first communication terminal.

30. The method according to claim 28, wherein the high bit rate is about 20 kilobits per second and the low bit rate is in the range of about 1–1000 bits per second.

31. The method according to claim 28, wherein said full two-way communication service comprises transmission by the base station of voice or data information associated with the first terminal to the second terminal of about 20 watts per channel at about 20 kilobits per second and transmission by the second terminal to the base station of voice or data information intended for the first terminal of about 20 milliwatts per channel at about 20 kilobits per second.

* * * * *